United States Patent
Yatake

(10) Patent No.: US 6,886,931 B2
(45) Date of Patent: May 3, 2005

(54) INK SET FOR INK JET RECORDING, METHOD FOR MANUFACTURING THE SAME, AND INK JET RECORDING APPARATUS

(75) Inventor: Masahiro Yatake, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 91 days.

(21) Appl. No.: 10/635,416

(22) Filed: Aug. 6, 2003

(65) Prior Publication Data

US 2004/0135863 A1 Jul. 15, 2004

(30) Foreign Application Priority Data

Aug. 7, 2002 (JP) ........................................ 2002-230288

(51) Int. Cl.⁷ ................................................. B41J 2/01
(52) U.S. Cl. ........................ 347/100; 347/101; 523/160
(58) Field of Search ........................... 347/100, 95, 96, 347/101; 106/31.6, 31.13; 523/160

(56) References Cited

U.S. PATENT DOCUMENTS

| | | | | |
|---|---|---|---|---|
| 5,942,028 A | * | 8/1999 | Tomiya et al. | 106/31.78 |
| 6,027,559 A | * | 2/2000 | Morii et al. | 428/403 |
| 6,499,839 B1 | * | 12/2002 | Busby et al. | 347/100 |
| 2004/0069182 A1 | * | 4/2004 | Nakajima | 106/31.13 |

FOREIGN PATENT DOCUMENTS

| | | | | |
|---|---|---|---|---|
| EP | 1142965 A1 | * | 10/2001 | ........... C09D/11/00 |
| JP | 9-272833 | | 10/1997 | |

OTHER PUBLICATIONS

Patent Abstracts of Japan of 9–272833 of Oct. 21, 1997.

* cited by examiner

Primary Examiner—Manish Shah
(74) Attorney, Agent, or Firm—Ladas & Parry LLP

(57) ABSTRACT

An ink set that affords high print quality and stable discharge, places a small load on the apparatus, has a plurality of colors of ink jet recording ink, allows a substantially uniform amount of each color of ink to be discharged, and yields a recorded image with virtually no difference in the size of the dots between colors, and a method for manufacturing this ink set, and an ink jet recording apparatus. The ink set for ink jet recording of the present invention includes a plurality of colors of ink containing pigments in which the aspect ratio ($\sigma$) between the major and minor axes of the pigment particles is 2 or less, and the value of $\eta(1-n(\sigma-1))$, which is calculated from the ink viscosity ($\eta$) as measured at a shear rate of 200 $S^{-1}$ and at 20° C., is within ±5% for said plurality of colors of ink. The method for manufacturing the ink set for ink jet recording of the present invention is such that the value of $\eta(1-n(\sigma-1))$, as measured at a specific shear rate and a specific temperature, is within ±5% for said plurality of colors of ink. The ink jet recording apparatus of the present invention makes use of the above-mentioned ink set for ink jet recording, and employs a head whose drive system is electrostrictive or thermal.

14 Claims, No Drawings

INK SET FOR INK JET RECORDING, METHOD FOR MANUFACTURING THE SAME, AND INK JET RECORDING APPARATUS

BACKGROUND OF THE INVENTION

1. Field of the Invention

The present invention relates to an ink set having a plurality of colors of ink capable of forming a stable discharge state, with which a substantially uniform amount of each ink can be discharged, and a recorded image with virtually no difference in the size of the dots between colors can be obtained, and to a method for manufacturing this ink set, and to an ink jet recording apparatus.

2. Description of the Related Art

Ink jet recording is a method in which droplets of ink are discharged from a fine nozzle to record text or graphics on the surface of a recording medium. Ink jet recording methods that have seen practical use include a method in which electrostrictive elements are used to convert electrical signals into mechanical signals, the ink stored in a nozzle head is intermittently discharged, and text or symbols are recorded on the surface of a recording medium, and a method in which the portion of the ink stored in the nozzle head that is very close to the discharge area is rapidly heated to generate bubbles, the volumetric expansion of these bubbles intermittently discharges the ink, and text or symbols are recorded on the surface of a recording medium.

Stable discharge is one of the requirements of inks used in ink jet recording such as this. Both dye inks and pigment inks are used for ink jet recording inks, but since dye inks that are used include direct dyes, acid dyes, and basic dyes, special care must be taken with a water-soluble ink jet recording ink because it dissolves uniformly in water and is substantially a Newtonian fluid, so its viscosity is not dependent on shear force. The use of a pigment ink for just black ink has also been studied, and in this case penetration is reduced and the ink may be dried on the paper or other medium, so the pigment concentration is only about 2 to 3 wt %, there is no problem with the ink being substantially a Newtonian fluid, and no special care is required by viscosity. However, when penetration is thus reduced, drying takes longer, which is contrary to the goal of high-speed printing. Also, if the other colors are printed at the same time, color mixing occurs at the boundaries, which lowers print quality.

Therefore, what is particularly problematic is that if the amount in which pigments, polymer fines, and the like are added is increased a certain amount in order to ensure a good penetration rate, the viscosity at the ink discharge site ends up being different from the viscosity at the supply site, which means that something like a special mechanism or electrical circuit is required to achieve stable discharge, and this puts an extremely high load on the apparatus.

Also, with prior art, the paper permeability of ink was low, and with a method for suppressing wetness on the surface of the paper, bleeding occurred with ordinary paper, and especially with the recycled paper that has become so popular in recent years. In addition, because the print took so long to dry, when continuous printing was performed, the ink printed on the paper tended not to dry, which prevented the next printed sheet from being stacked on top of the previous sheet. Another problem was that in multicolor printing the adjacent colors would mix together, causing the letters to bleed.

Also, recycled paper is a blend of many different kinds of paper, the permeabilities of which can vary, and this difference in permeation rate also makes bleeding worse. However, if the paper or other printing medium is heated during printing, it takes time for the heating component of the apparatus to reach the required temperature, the apparatus consumes more electrical power, and such a system also tends to damage paper and other printing media.

Further, when paper coated with an ordinary sizing agent or the like is used as the printing medium and printed with an ink containing pigment, the pigment will remain on the surface of the paper, and scuffing resistance suffers. Also, when the surface tension of an ink was high as in the past, this limited the types of paper on which uniform printing was possible, and this tended to decrease the quality of the printed images. One way to deal with this is to increase the permeation rate and add a larger amount of pigments, etc., but when the permeation rate is raised and the amount in which pigments, polymer fines, and so forth are added is increased by a certain amount, this causes the viscosity at the ink discharge site to be different from the viscosity at the supply site, resulting in unstable discharge and requiring a specific mechanism, electrical circuit, etc., and this puts an extremely high load on the apparatus.

SUMMARY OF THE INVENTION

In view of this, the present invention is intended to solve these problems, and it is an object thereof to provide an ink set that affords high print quality and stable discharge of the ink jet recording ink, places a small load on the apparatus, has a plurality of colors of ink jet recording ink, allows a substantially uniform amount of each ink to be discharged, and yields a recorded image with virtually no difference in the size of the dots between colors, and a method for manufacturing this ink set, and an ink jet recording apparatus.

The ink jet recording ink set of the present invention is an ink set having a plurality of colors of ink jet recording ink, wherein said plurality of colors of ink contain pigments, the aspect ratio ($\sigma$) between the major and minor axes of the pigment particles is 2 or less, and the value of $\eta(1-n(\sigma-1))$ (n is a coefficient indicating $(\eta_L-\eta_H)/\eta_H$, where $\eta_L$ is the viscosity measured at a shear rate of 10 $S^{-1}$, and $\eta_H$ is the viscosity measured at a shear rate of 1000 $S^{-1}$; $0.1 \geq n$), which is calculated from the viscosity ($\eta$) of said plurality of colors of ink as measured at a shear rate of 200 $S^{-1}$ and at 20° C., is within ±5% for said plurality of colors of ink.

The method for manufacturing an ink set for ink jet recording of the present invention is a method for manufacturing the above-mentioned ink set, wherein the value of $\eta(1-n(\sigma-1))$ ($0.1 \geq n$), which is calculated from the viscosity ($\eta$) of said plurality of colors of ink as measured at a specific shear rate and a specific temperature, is within ±5% for said plurality of colors of ink.

The ink jet recording apparatus of the present invention is equipped with the above-mentioned ink set for ink jet recording, wherein ink jet recording is performed in which ink droplets are affixed to a recording medium by a head whose drive system is electrostrictive or thermal.

DESCRIPTION OF THE PREFERRED EMBODIMENTS

The present invention is the result of diligent research aimed at being able to perform ink jet recording stably with an ink jet ink when colorant particles such as pigments are used in an ink for ink jet recording, or when pigments and polymer fines are used, and providing an ink set for ink jet recording that has a plurality of colors of ink, allows a substantially uniform amount of each color of ink to be discharged, and yields a recorded image with virtually no difference in the size of the dots between colors.

The ink set for ink jet recording of the present invention is an ink set having a plurality of colors of ink, wherein said plurality of colors of ink contain pigments, the aspect ratio ($\sigma$) between the major and minor axes of the pigment particles is 2 or less, and the value of $\eta(1-n(\sigma-1))$ (n is a coefficient indicating $(\eta_L-\eta_H)/\eta_H$, where $\eta_L$ is the viscosity measured at a shear rate of 10 $S^{-1}$, and $\eta_H$ is the viscosity measured at a shear rate of 1000 $S^{-1}$; $0.1 \geq n$), which is calculated from the viscosity ($\eta$) of said plurality of colors of ink as measured at a shear rate of 200 $S^{-1}$ and at 20° C., is within ±5% for said plurality of colors of ink.

The method for manufacturing the ink set for ink jet recording of the present invention is a method for manufacturing the above-mentioned ink set having a plurality of colors of ink, wherein the value of $\eta(1-n(\sigma-1))$ ($0.1 \geq n$), which is calculated from the viscosity ($\eta$) of the plurality of colors of ink, as measured at a specific shear rate and a specific temperature, is within ±5% for said plurality of colors of ink.

The ink jet recording apparatus of the present invention makes use of the above-mentioned ink set for ink jet recording, wherein ink jet recording is performed in which ink droplets are affixed to a recording medium by a head whose drive system is electrostrictive or thermal.

In the present invention, it is preferable if the particle size of the pigments has a aspect average of 10 to 200 nm. The pigment particles will be too small if the size is less than 10 nm, and will therefore penetrate into the voids of the paper, etc., which decreases color expression. It is also undesirable for the size to be over 200 nm, though, because the pigment will precipitate at the viscosity that is favorable for ink jet recording. A preferable size range is 50 to 150 nm, with 70 to 110 nm being even better.

The statistical viewing method here involves the use of a scanning electron microscope (SEM) or transmission electron microscope (TEM). There are means for optically observing pigments and other substance in the form of particles, but it is difficult to ascertain the shape of the particles with an optical method. The shape is determined from micrographs taken with a scanning electron microscope (SEM) or transmission electron microscope (TEM), and at least 10 particles should be sampled. These microscopes produce two-dimensional expressions, but it is preferable for the ratio of the major and minor axes to be within the above range. The major axis is the X axis, and the minor axis is the shorter of the Y axis and the Z axis. Since the particles are actually three-dimensional, if they are expressed using XYZ axes, it is even better to compare the longest portion (X axis) with the shortest portion (the shorter of the Y axis and the Z axis).

The above-mentioned pigments are carbon black and/or organic pigments. Carbon blacks and organic pigments with a density of 2 or less are preferable as ink jet pigments. From the standpoint of discharge stability in ink jet recording, the plurality of colors of ink preferably have a viscosity of at least 2 mPa·s and no more than 10 mPa·s. The above restrictions are unnecessary below 2 mPa·s, and are also unnecessary over 10 mPa·s. The surface tension of the plurality of colors of ink is no more than 40 mN/m.

If the surface tension is over 40 mN/m, permeability into paper will decrease, bleeding will tend to occur, the dots will be smaller, and the [desired] line width will not be obtained unless more ink is used. If more ink is used, though, bleeding will be even more apt to occur. The surface tension is preferably 35 mN/m or less, with 33 mN/m or less being even better.

The above-mentioned pigments may be dissolved or dispersed in water without the use of a dispersant, or may be dissolved or dispersed in water by a polymer. When they are dissolved or dispersed in water by a polymer, microcapsules comprising pigment covered by a polymer are preferable from the standpoints of storage stability, color expression, and so forth. Also, the above-mentioned pigments are produced by media-less dispersion. With media dispersion, impurities are likely to be admixed, and the pigment particles tend not to be spherical, so media-less dispersion is preferred. It is also preferable for the above-mentioned media-less dispersion to be accomplished with a nanomizer or a jet mill. This is because a nanomizer or a jet mill will make the particles more spherical in shape, resulting in less structural viscosity. It is preferable for the shape to be close to spherical because the surface area will smaller, so the particles will be less susceptible to oxidation and the durability of the printed matter will be better.

As described above, the ink set for ink jet recording of the present invention is an ink set having a plurality of colors of ink, said plurality of colors of ink contain pigments, the aspect ratio ($\sigma$) between the major and minor axes of the pigment particles is 2 or less, and the value of $\eta(1-n(\sigma-1))$ (n is a coefficient indicating $(\eta_L-\eta_H)/\eta_H$, where $\eta_L$ is the viscosity measured at a shear rate of 10 $S^{-1}$, and $\eta_H$ is the viscosity measured at a shear rate of 1000 $S^{-1}$; $0.1 \geq n$), which is calculated from the viscosity ($\eta$) of said plurality of colors of ink as measured at a shear rate of 200 $S^{-1}$ and at 20° C., is within ±5% for said plurality of colors of ink.

The result of keeping the difference between the $\eta(1-n(\sigma-1))$ considering the particle shape and viscosity measured at various shear rates to 5% or less, rather than using just one viscosity, is that the discharge amount is consistent for every color ink jet ink. Since it is preferable for this value to be as small as possible, 3% or less is even better, and 1% or less is especially good. Conversely, the discharge amount will be consistent for every color if this value is consistent.

Further, the method for manufacturing an ink set for ink jet recording of the present invention is a method for manufacturing the above-mentioned ink set having a plurality of colors of ink, wherein the value of $\eta(1-n(\sigma-1))$ ($0.1 \geq n$), which is calculated from the viscosity ($\eta$) of said plurality of colors of ink as measured at a specific shear rate and a specific temperature, is adjusted to be within ±5% for said plurality of colors of ink. Preferably, this value is adjusted to be as close to 0% as possible. In this case, it is preferable if the above-mentioned specific temperature is from 5 to 50° C. and the above-mentioned specific shear rate is from 0.1 to $10^4$ $S^{-1}$. As mentioned above, $\sigma$ is a value of at least 1 (spheres), but is preferably no more than 2, in which case n is preferably 0.1 or less. If 0.1 is exceeded, structural viscosity will have an adverse effect on the discharge of ink from the nozzle. Also, the amount of ink discharged is made substantially uniform by keeping the viscosity difference between the various colors found as above to no more than ±5%.

The ink jet recording apparatus of the present invention is equipped with the above-mentioned ink set for ink jet recording, wherein ink jet recording is performed in which ink droplets are affixed to a recording medium by a head whose drive system is electrostrictive or thermal. Thus, the present invention can be applied to both electrostrictive heads and thermal heads.

Polymer fines can also be used simultaneously with the pigment dispersion in the present invention. An aqueous emulsion composed of polymer fines can also be added in the present invention. The added amount thereof is at least 0.1 wt % (hereinafter referred to simply as "%") and no more than 10%. The effect of increasing scuffing resistance will be minimal if the amount is less than 0.1%, but exceeding 10% increases the viscosity of the ink, making it less suitable as an ink jet recording ink. Examples of substances that can be used to form an emulsion in which polymer fines are dispersed include styrene, tetrahydrofurfuryl acrylate, butyl methacrylate, (α, 2, 3, or 4)-alkylstyrene, (α, 2, 3, or 4)-alkoxystyrene, 3,4-dimethylstyrene, α-phenylstyrene, divinylbenzene, vinylnaphthalene, dimethylamino (meth) acrylate, dimethylaminoethyl (meth)acrylate, dimethylaminopropylacrylamide, N,N-dimethylaminoethyl acrylate, acryloylmorpholine, N,N-dimethylacrylamide, N-isopropylacrylamide, N,N-diethylacrylamide, methyl (meth)acrylate, ethyl (meth)acrylate, propyl (meth)acrylate, ethylhexyl (meth)acrylate, and other alkyl (meth)acrylates, methoxydiethylene glycol (meth)acrylate, (meth)acrylates of diethylene glycol or polyethylene glycol with ethoxy groups, propoxy groups, or butoxy groups, cyclohexyl (meth)acrylate, benzyl (meth)acrylate, phenoxyethyl (meth) acrylate, isobornyl (meth)acrylate, hydroxyalkyl (meth) acrylate, and other fluorine-, chlorine-, and silicon-containing (meth)acrylates, (meth)acrylamide, maleic acid amide, (mono, di, tri, tetra, or poly)ethylene glycol (meth) acrylate when a crosslinked structured is introduced in addition to the single function of (meth)acrylic acid or the like, 1,4-butanediol, 1,5-pentanediol, 1,6-hexanediol, 1,8-octanediol, 1,10-decanediol, and other such (meth)acrylates, trimethylolpropane tri(meth)acrylate, glycerol (di or tri) (meth)acrylate, di(meth)acrylates of ethylene oxide adducts of bisphenol A or F, neopentyl glycol di(meth)acrylate, pentaerythritol tetra(meth)acrylate, and dipentaerythritol hexa(meth)acrylate.

Examples of emulsifiers used to form the polymer fines include sodium laurylsuflate and potassium lauryl sulfate, as well as anionic surfactants, nonionic surfactants, and amphoteric surfactants, and any surfactants that can be added to the above-mentioned ink. Potassium persulfate, ammonium persulfate, hydrogen persulfate, azobisisobutyronitrile, benzoyl peroxide, dibutyl peroxide, peracetic acid, cumene hydroperoxide, tert-butyl hydroxyperoxide, paramenthane hydroperoxide, and the like can be used as polymerization initiators. Tert-dodecylmercaptan, n-dodecylmercaptan, n-octylmercaptan, the xanthogens dimethylxanthogen disulfide and diisobutylxanthogen disulfide, dipentene, indene, 1,4-cyclohexadiene, dihydrofuran, xanthene, and the like can be used as chain transfer agents for polymerization.

With an ink containing a relatively large amount of solids such as pigments and polymer fines as in the present invention, the ink may dry up and become sticky at the front of the nozzle if the nozzle is not used for an extended period, and this tends to result in inconsistent printing. However, if the ink is moved very slightly at the front of the nozzle, but not so much that it will be discharged, the ink can be agitated and then stably discharged. The use of electrostrictive elements makes it easier to control this. Therefore, if such a mechanism is employed for the various colors of ink constituting the ink set for ink jet recording of the present invention, the pigment concentration in the ink can be increased, and even if a substance is used that would tend to result in foaming in the emulsion or the like, ink can still be discharged stably and at a higher color density.

EXAMPLES

The present invention will now be described through examples and so forth, but the present invention is not limited in any way by these examples, etc.

Manufacture of Pigment Dispersion

Monarch 880, a carbon black made by Cabot, was used for Dispersion 1. The interior of a reaction vessel equipped with a stirrer, a thermometer, a reflux pipe, and a dropping funnel was replaced with nitrogen, after which 20 parts styrene, 5 parts α-methylstyrene, 15 parts butyl methacrylate, 10 parts lauryl methacrylate, 2 parts acrylic acid, and 0.3 part tert-dodecylmercaptan were put into the vessel and heated to 70° C. A separately prepared mixture of 150 parts styrene, 15 parts acrylic acid, 50 parts butyl methacrylate, 1 part tert-dodecylmercaptan, 20 parts methyl ethyl ketone, and 3 parts azobisisobutyronitrile was put into the dropping funnel and dropped into the reaction vessel over a period of 4 hours while being dispersed, and a polymerization reaction was conducted. Methyl ethyl ketone was then added to the reaction vessel to produce a dispersed polymer solution with a concentration of 40%.

40 parts of the above-mentioned dispersed polymer solution was mixed with 30 parts Monarch 880 (a carbon black made by Cabot) that had been ground for 1 hour in a nanomizer (made by Yoshida Kikai Kogyo), 100 parts of a 0.1 mol/L sodium hydroxide aqueous solution, and 30 parts methyl ethyl ketone, and the system was stirred for 30 minutes with a homogenizer. After this, 300 parts ion exchange water was added, and the system was stirred for another hour. All of the methyl ethyl ketone and part of the water were then distilled off with a rotary evaporator, the pH was adjusted to 9 by neutralizing with a 0.1 mol/L sodium hydroxide, and the system was then filtered through a 0.3 $\mu$m membrane filter, which yielded dispersion 1 having a solids content (dispersed polymer and carbon black) of 20%.

Dispersions 2 to 4 were obtained by the same procedure as above. Pigment Blue 15:4 (made by Clariant) was used for dispersion 2, Pigment Red 122 (made by Clariant) was used for dispersion 3, and Pigment Yellow 180 (made by Clariant) was used for dispersion 4.

Manufacture of Polymer Fines A 100 parts ion exchange water was put into a reaction vessel equipped with a dropping apparatus, a thermometer, a water-cooled reflux condenser, and a stirrer, and 0.2 part potassium persulfate (polymerization initiator) was added under stirring at 70° C. in a nitrogen atmosphere. A monomer solution, prepared by adding 0.05 part sodium laurylsulfate, 5 parts styrene, 6 parts tetrahydrofurfuryl acrylate, 5 parts butyl methacrylate, and 0.02 part tert-dodecylmercaptan to 7 parts ion exchange water, was added dropwise at 70° C. to produce a primary substance. 2 parts of a 10% solution of ammonium persulfate was added under stirring to this primary substance, and then a reaction solution composed of 30 parts ion exchange water, 0.2 part potassium laurylsulfate, 30 parts styrene, 15 parts butyl methacrylate, 16 parts butyl acrylate, 2 parts methacrylic acid, 1 part polyethylene glycol 200 dimethacrylate, and 0.5 part tert-dodecylmercaptan was added at 70° C. under stirring, and a polymerization reaction was conducted. After this, the system was neutralized with ammonia to adjust the pH to between 8 and 8.5, and this product was filtered through a 0.3 $\mu$m filter to produce a polymer fines aqueous solution.

Production of ink jet recording ink

| Ink aqueous solution B | Added amount (%) |
|---|---|
| 1,2-hexanediol | 3.0 |
| triethylene glycol monobutyl ether | 1.0 |
| Olfine E1010 (made by Nisshin Chemical) | 0.6 |
| 2-pyrrolidone | 2.0 |
| triethylene glycol | 2.0 |
| trimethylolpropane | 5.0 |
| glycerol | 8.0 |
| ion exchange water | 21.5 |

Example 1

| | |
|---|---|
| dispersion 1 (105) | 7.5 |
| the above-mentioned ink aqueous solution B | 40.0 |
| triethanolamine | 0.8 |
| ion exchange water | balance |

Example 2

| | |
|---|---|
| dispersion 2 (85) | 4.5 |
| the above-mentioned ink aqueous solution B | 40.0 |
| ion exchange water | balance |

Example 3

| | |
|---|---|
| dispersion 3 (90) | 5.5 |
| the above-mentioned ink aqueous solution B | 40.0 |
| ion exchange water | balance |

Example 4

| | |
|---|---|
| dispersion 4 (80) | 5.0 |
| the above-mentioned ink aqueous solution B | 40.0 |
| ion exchange water | balance |

Example 5

| | |
|---|---|
| dispersion 1 (105) | 3.0 |
| the above-mentioned ink aqueous solution B | 40.0 |
| polymer fines A | 1.0 |
| triethanolamine | 0.9 |
| ion exchange water | balance |

Example 6

| | |
|---|---|
| dispersion 2 (90) | 5.0 |
| polymer fines A | 1.0 |
| the above-mentioned ink aqueous solution B | 40.0 |
| ion exchange water | balance |

Example 7

| | |
|---|---|
| dispersion 3 (90) | 5.0 |
| polymer fines A | 1.0 |
| the above-mentioned ink aqueous solution B | 40.0 |
| ion exchange water | balance |

Example 8

| | |
|---|---|
| dispersion 4 (95) | 5.5 |
| polymer fines A | 1.0 |
| the above-mentioned ink aqueous solution B | 40.0 |
| ion exchange water | balance |

The ion exchange water that made up the balance of the ink aqueous solution B contained 0.1% Proxel XL-2 (made by the British firm of Abisia) to prevent ink corrosion, 0.02% benzotriazole to prevent the corrosion of the ink jet head components, and 0.03% ethylenediamine-tetraacetic acid-2-sodium salt (EDTA) to reduce the effect of metal ions in the ink system.

The composition of the inks used in the comparative examples is given below. The pigment indicated in the comparative examples was carbon black dispersed with a random copolymerization type of styreneacrylic acid-based dispersant. The average particle size of the pigment is given in parentheses in nm units.

Comparative Example 1

| | |
|---|---|
| water-soluble pigment 9 (90) | 5.0 |
| glycerol | 10.0 |
| dispersant | 3.0 |
| nonionic surfactant | 1.0 |
| ion exchange water | balance |

Comparative Example 2

| | |
|---|---|
| water-soluble dye (food black 2) | 5.5 |
| DEGmME | 7.0 |
| diethylene glycol | 10.0 |
| 2-pyrrolidone | 5.0 |
| ion exchange water | balance |

(DEGmME: diethylene glycol monomethyl ether)

Comparative Example 3

| | |
|---|---|
| water-soluble pigment 11 (110) | 5.5 |
| water-soluble dye (food black 2) | 2.5 |
| diethylene glycol | 10.0 |
| nonionic surfactant | 1.0 |
| ion exchange water | balance |

Print Evaluation

As a print evaluation, Table 1 shows the results of evaluating the bleeding printed letters. In Table 1, A indicates extremely good, with virtually no bleeding, B indicates good, with only a little bleeding, C indicates poor, with considerable bleeding, and D indicates extremely poor, with pronounced bleeding.

TABLE 1

PRINT QUALITY EVALUATION RESULTS

| | EXAMPLE | | | | | | | | COMPARATIVE EXAMPLE | | |
|---|---|---|---|---|---|---|---|---|---|---|---|
| | 1 | 2 | 3 | 4 | 5 | 6 | 7 | 8 | 1 | 2 | 3 |
| Conqueror | A | A | A | A | A | A | A | A | C | C | C |
| Favorit | A | A | A | A | A | A | A | A | D | D | D |
| Modo Copy | A | A | A | A | A | A | A | A | C | D | D |
| Rapid Copy | A | A | A | A | A | A | A | A | D | D | D |
| EPSON EPP | A | A | A | A | A | A | A | A | C | C | C |
| Xerox P | A | A | A | A | A | A | A | A | C | C | D |
| Xerox 4024 | A | A | A | A | A | A | A | A | D | D | D |
| Xerox 10 | A | A | A | A | A | A | A | A | C | D | D |
| Neenah Bond | A | A | A | A | A | A | A | A | C | D | D |
| Reymat | A | A | A | A | A | A | A | A | C | C | C |
| Yamayuri | A | A | A | A | A | A | A | A | D | D | D |
| Xerox R | A | A | A | A | A | A | A | A | D | D | D |

As is clear from the results in Table 1, the print quality was poor with the inks used in the comparative examples, but was good with the ink jet recording inks of the present invention. The print evaluation was carried out using a PM-930C ink jet printer made by Seiko-Epson. Ordinary paper commercially available in Europe, the United States, and Japan was used for this evaluation, namely, Conqueror paper, Favorit paper, Modo Copy paper, Rapid Copy paper, Epson EPP paper, Xerox 4024 paper, Xerox 10 paper, Neenha Bond paper, Ricopy 6200 paper, Yamayuri paper, and Xerox R paper.

Optimization of σ Value

Table 2 shows the values for the ratio σ between the major and minor axes of the pigment particles, and the discharge stability, storage stability, and light resistance. The σ value was the average for 30 particles in a photograph of the dispersed pigment taken with a TEM (transmission electron microscope). The value of σ was varied by changing the dispersion method. Discharge stability was evaluated as the continuous printing stability using an EM930C made by Seiko-Epson. A rating of A was given if at least 1000 pages of A4-size PPC paper could be printed with 15,000 letters without any problem, B if there were only 1 or 2 print problems per 1000 pages, C if there were 2 to 10 print problems, and D if there were more than 10 print problems. The storage stability was rated A if the change in viscosity after 7 days at 70° C. in the form of ink was less than 1%, B if the change was 1 to 2%, C if the change was over 2% but no more than 5%, and D if the change was over 5%. Light resistance is indicated by the decrease (%) in color density (OD value) when irradiated with 500,000 lux with a Ci5000 xenon weatherometer made by Toyo Seiki.

TABLE 2

RESULTS OF MEASURING DISCHARGE STABILITY, STORAGE STABILITY, AND LIGHT RESISTANCE

|  | σ VALUE | DISCHARGE STABILITY | STORAGE STABILITY | LIGHT RESISTANCE |
|---|---|---|---|---|
| EXAMPLE1 | 1.2 | A | A | 2 |
|  | 1.9 | B | A | 5 |
|  | 2.2 | C | B | 10 |
| EXAMPLE2 | 1.3 | A | A | 3 |
|  | 1.9 | A | B | 10 |
|  | 2.5 | C | C | 20 |
| EXAMPLE3 | 1.5 | A | A | 4 |
|  | 2.0 | B | B | 11 |
|  | 3.0 | D | D | 23 |
| EXAMPLE4 | 1.4 | A | A | 10 |
|  | 1.9 | B | B | 19 |
|  | 2.8 | D | C | 50 |
| EXAMPLE5 | 1.2 | A | A | 2 |
|  | 1.9 | B | B | 5 |
|  | 2.3 | D | C | 9 |
| EXAMPLE6 | 1.3 | A | A | 3 |
|  | 1.9 | B | B | 9 |
|  | 2.5 | D | C | 18 |
| EXAMPLE7 | 1.4 | A | A | 4 |
|  | 2.0 | B | B | 10 |
|  | 3.0 | D | C | 22 |

TABLE 2-continued

RESULTS OF MEASURING DISCHARGE STABILITY, STORAGE STABILITY, AND LIGHT RESISTANCE

|  | σ VALUE | DISCHARGE STABILITY | STORAGE STABILITY | LIGHT RESISTANCE |
|---|---|---|---|---|
| EXAMPLE8 | 1.5 | A | A | 9 |
|  | 1.8 | B | B | 18 |
|  | 2.4 | D | C | 40 |

It can be seen from the results in Table 2 that discharge stability and storage stability decreased when the value of σ was over 2. It can also be seen that light resistance improved when the value of σ was 2 or less.

Optimization of $\eta(1-n(\sigma-1))$; (where $0.1 \geq n$)

Table 3 shows the change in the discharge amount for each color printed by ink jet printing using the pigment dispersions produced by varying the dispersion method to vary the value of $\eta(1-n(\sigma-1))$; (where $0.1 \geq n$). Three examples of combinations of Examples 1 to 4, and three examples of combinations of Examples 5 to 8 are given. The η value was varied by adjusting the amount of added glycerol. $\eta(1-n(\sigma-1))$; indicates the viscosity difference (%), found from the value of σ found for 30 particles in a photograph taken using an S4700 scanning electron microscope (SEM) made by Hitachi and the viscosity measured with an RFSII viscoelasticity measurement device made by Rheometrics. Dispersions made from carbon black in Example 1 and Example 5 were used as references, and the difference (%) in the discharge amount from each reference is given. In Table 3, a rating of A was given if the discharge amount difference from the reference-was less than 5%, B if at least 5% and less than 10%, C if at least 10% and less than 15%, and D if at least 15%. An EM930C made by Seiko-Epson was used for this measurement.

TABLE 3

DISCHARGE AMOUNT WHEN VALUE OF $\eta(1 - n(\sigma- 1))$ (WHERE $0.1 \geq n$) WAS VARIED

| COMBINATION | COMPOSITION | η VALUE | σ VALUE | n VALUE | VISCOSITY DIFFERENCE (%) | DISCHARGE AMOUNT DIFFERENCE (%) | RATING |
|---|---|---|---|---|---|---|---|
| 1 | EXAMPLE1 | 4.0 | 1.5 | 0.05 | REFERENCE | REFERENCE | B |
|  | EXAMPLE2 | 4.0 | 1.2 | 0.04 | +1.74 | −3.5 |  |
|  | EXAMPLE3 | 4.0 | 1.8 | 0.08 | −4.00 | +8.2 |  |
|  | EXAMPLE4 | 4.0 | 1.3 | 0.06 | +0.72 | −1.6 |  |
| 2 | EXAMPLE1 | 4.1 | 1.5 | 0.05 | REFERENCE | REFERENCE | A |
|  | EXAMPLE2 | 4.0 | 1.2 | 0.04 | −0.74 | +1.8 |  |
|  | EXAMPLE3 | 4.3 | 1.8 | 0.08 | +0.72 | −1.9 |  |
|  | EXAMPLE4 | 4.1 | 1.3 | 0.06 | +0.72 | −2.0 |  |
| 3 | EXAMPLE1 | 4.1 | 1.5 | 0.05 | REFERENCE | REFERENCE | C |
|  | EXAMPLE2 | 3.8 | 1.2 | 0.04 | +5.70 | +13.5 |  |
|  | EXAMPLE3 | 4.2 | 1.8 | 0.08 | +1.67 | +3.2 |  |
|  | EXAMPLE4 | 3.9 | 1.3 | 0.06 | +4.20 | +8.8 |  |
| 4 | EXAMPLE5 | 4.2 | 1.6 | 0.05 | REFERENCE | REFERENCE | A |
|  | EXAMPLE6 | 4.1 | 1.4 | 0.04 | −0.97 | −1.5 |  |
|  | EXAMPLE7 | 4.4 | 1.9 | 0.08 | +0.23 | +1.0 |  |
|  | EXAMPLE8 | 4.1 | 1.3 | 0.06 | +1.17 | +3.1 |  |
| 5 | EXAMPLE5 | 4.2 | 1.6 | 0.05 | REFERENCE | REFERENCE | B |
|  | EXAMPLE6 | 4.1 | 1.4 | 0.04 | −0.97 | +2.5 |  |
|  | EXAMPLE7 | 4.1 | 1.8 | 0.08 | −3.51 | −7.9 |  |
|  | EXAMPLE8 | 4.1 | 1.5 | 0.06 | −2.38 | −6.0 |  |

TABLE 3-continued

DISCHARGE AMOUNT WHEN VALUE OF
$\eta(1 - n(\sigma- 1))$ (WHERE $0.1 \geq n$) WAS VARIED

| COMBINATION | COMPOSITION | η VALUE | σ VALUE | n VALUE | VISCOSITY DIFFERENCE (%) | DISCHARGE AMOUNT DIFFERENCE (%) | RATING |
|---|---|---|---|---|---|---|---|
| 6 | EXAMPLE5 | 4.0 | 1.5 | 0.05 | REFERENCE | REFERENCE | D |
|   | EXAMPLE6 | 4.0 | 1.7 | 0.04 | −0.31 | +1.3 |   |
|   | EXAMPLE7 | 4.0 | 2.4 | 0.18 | −23.3 | +27.5 |   |
|   | EXAMPLE8 | 4.0 | 2.6 | 0.16 | −17.6 | +21.5 |   |

It can be seen from the results in Table 3 that the difference in discharge amount was no less than 10% with the ink sets pertaining to combinations 3 and 6, in which the value of $\eta(1-n(\sigma-1))$; exceeding 5% for each color (comparative example ink set). It can also be seen that the difference in the discharge amount was very large when the value of n was over 0.1. Furthermore, it can be seen that even when the viscosity was the same as measured at a shear rate of 200 S$^{-1}$ as in combination 6 in Table 3, a difference in the discharge amount occurred with certain values for n and σ. It is undesirable for there to be a difference in discharge amount because the size of the dots will vary with the color. In contrast, with the ink sets pertaining to combinations 1, 2, 4, and 5, in which the value of $\eta(1-n(\sigma-1))$; was 5% or less for each color (examples of the ink set of the present invention), it is clear that the discharge amount of the various colors of ink is substantially uniform (within 10%), and it is possible to obtain an excellent recorded image of high quality, with dots of the various colors being substantially the same size.

Optimization of Dispersion Method

Table 4 shows the results of measuring the a value when the dispersion method was varied, and the results for storage stability and light resistance. Table 4 shows the results obtained using the same carbon black (black), Pigment Blue 15:4 (cyan), Pigment Red 122 (magenta), and Pigment Yellow 180 (yellow) as those used in Examples 1 to 4, which were dispersed by the same methods. With methods involving media dispersion, namely, a bead mill, sand mill, and basket mill, zirconia beads with a diameter of 1 to 1.5 mm were used, the optimal conditions for each color were ascertained, and dispersion was performed by the ordinary method employed for each apparatus. With methods involving non-media dispersion, namely, a jet mill and nanomizer, the optimal conditions for each color were again ascertained and dispersion was performed by the ordinary method employed for each apparatus. The σ value, storage stability, and light resistance in Table 4 were evaluated by the same methods, and the same evaluation references were used, as in Table 2.

TABLE 4

RESULTS OF MEASURING σ VALUE,
STORAGE STABILITY, AND LIGHT RESISTANCE
BY DISPERSION METHOD

|   |   | σ VALUE | STORAGE STABILITY | LIGHT RESISTANCE |
|---|---|---|---|---|
| BEADS MILL | BLACK | 2.6 | B | A |
|   | CYAN | 2.4 | B | B |
|   | MAGENTA | 3.0 | D | C |
|   | YELLOW | 3.8 | C | D |
| SAND MILL | BLACK | 2.4 | B | A |
|   | CYAN | 2.9 | B | B |
|   | MAGENTA | 3.3 | D | C |
|   | YELLOW | 3.8 | C | D |
| BASKET MILL | BLACK | 2.6 | C | A |
|   | CYAN | 3.4 | C | B |
|   | MAGENTA | 3.5 | D | C |
|   | YELLOW | 2.8 | D | D |
| NANOMIZER | BLACK | 1.7 | A | A |
|   | CYAN | 1.5 | A | A |
|   | MAGENTA | 1.8 | A | A |
|   | YELLOW | 1.6 | A | A |
| JET MILL | BLACK | 1.6 | A | A |
|   | CYAN | 1.4 | A | A |
|   | MAGENTA | 1.7 | A | A |
|   | YELLOW | 1.5 | A | A |

It can be seen from the results in Table 4 that the σ value, which is the ratio of the major and minor axes of the pigment particles, can be lowered to 2 or less by using a jet mill or nanomizer, and that the impurity content can also be reduced, which improves the storage stability and light resistance.

Thus, it can be seen that producing an ink jet ink in which the aspect ratio (σ) between the major and minor axes of the pigment particles is 2 or less, and keeping the value of $\eta(1-n(\sigma-1))$; (where $0.1 \geq n$) to within ±5% enhance the discharge stability, storage stability, light resistance, and other such characteristics of an ink jet ink.

It is therefore possible to provide an ink jet recording ink that affords high print quality and stable discharge, requires no special head drive system for each color, and imposes less load on the apparatus because the same drive apparatus is used, as well as an ink set that yields recorded images in which there is virtually no difference in the size of the dots of various colors and with which the discharge amount is substantially uniform for the various colors of ink, a method for manufacturing this ink set, and an ink jet recording apparatus.

The present invention should not be construed as being limited to these examples, and various modifications are possible within the scope of the present invention.

As described above, the present invention provides an ink set that affords high print quality and stable discharge, places a small load on the apparatus, has a plurality of colors of ink jet recording ink, allows a substantially uniform amount of each color of ink to be discharged, and yields a recorded image with virtually no difference in the size of the dots between colors, and a method for manufacturing this ink set, and an ink jet recording apparatus.

What is claimed is:

1. An ink set for ink jet recording, having a plurality of colors of ink jet recording ink, wherein said plurality of colors of ink contain pigments, the aspect ratio ($\sigma$) between the major and minor axes of the pigment particles is 2 or less, and the value of $\eta(1-n(\sigma-1))$ (n is a coefficient indicating $(\eta_L-\eta_H)/\eta_H$, where $\eta_L$ is the viscosity measured at a shear rate of $10\ S^{-1}$, and $\eta_H$ is the viscosity measured at a shear rate of $1000\ S^{-1}$; $0.1 \geq n$), which is calculated from the viscosity ($\eta$) of said plurality of colors of ink as measured at a shear rate of $200\ S^{-1}$ and at 20° C., is within ±5% for said plurality of colors of ink.

2. The ink set for ink jet recording according to claim 1, wherein the particle size of the pigments has a aspect average of 10 to 200 nm.

3. The ink set for ink jet recording according to claim 1 or 2, wherein the statistical viewing method involves the use of a scanning electron microscope (SEM) or transmission electron microscope (TEM).

4. The ink set for ink jet recording according to any of claims 1 to 3, wherein the major axis is the X axis, and the minor axis is the shorter of the Y axis and the Z axis.

5. The ink set for ink jet recording according to any of claims 1 to 4, wherein the pigments are carbon black and/or organic pigments.

6. The ink set for ink jet recording according to any of claims 1 to 5, wherein the viscosity of the plurality of colors of ink is at least 2 mPa·s and no more than 10 mPa·s.

7. The ink set for ink jet recording according to any of claims 1 to 6, wherein the surface tension of the plurality of colors of ink is no more than 40 mN/m.

8. The ink set for ink jet recording according to any of claims 1 to 7, wherein the pigments are dissolved or dispersed in water without the use of a dispersant.

9. The ink set for ink jet recording according to any of claims 1 to 7, wherein the pigments are dissolved or dispersed in water by a polymer.

10. The ink set for ink jet recording according to any of claims 1 to 9, wherein the pigments are subjected to media-less dispersion.

11. The ink set for ink jet recording according to claim 10, wherein the media-less dispersion is accomplished with a nanomizer or a jet mill.

12. A method for manufacturing the ink set for ink jet recording according to any of claims 1 to 11, wherein the value of $\eta(1-n(\sigma-1))$ ($0.1 \geq n$), which is calculated from the viscosity ($\eta$) of said plurality of colors of ink as measured at a specific shear rate and a specific temperature, is adjusted to be within ±5% for said plurality of colors of ink.

13. The method for manufacturing the ink set for ink jet recording according to claim 12, wherein the specific temperature is 5 to 50° C., and the specific shear rate is 0.1 to $10^4\ S^{-1}$.

14. An ink jet recording apparatus equipped with the ink set for ink jet recording according to any of claims 1 to 11, wherein ink jet recording is performed with a head whose drive system is electrostrictive or thermal.

* * * * *